(12) United States Patent
Schroeder et al.

(10) Patent No.: US 6,283,642 B1
(45) Date of Patent: Sep. 4, 2001

(54) FIBER OPTIC CONNECTOR

(75) Inventors: Fred Georg Schroeder, Grosse Ile.; John Pelino, Clinton Township, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/415,163

(22) Filed: Oct. 8, 1999

(51) Int. Cl.⁷ .................................................. G02B 6/36
(52) U.S. Cl. .................. 385/78; 385/60; 385/62; 385/81; 385/84
(58) Field of Search .................. 385/78, 84, 81, 385/60, 62

(56) References Cited

U.S. PATENT DOCUMENTS

| | | |
|---|---|---|
| 3,861,781 | 1/1975 | Hasegawa et al. . |
| 4,747,658 | 5/1988 | Borsuk et al. . |
| 4,759,600 | 7/1988 | Caron et al. . |
| 5,050,956 | 9/1991 | Carpenter et al. . |
| 5,094,494 * | 3/1992 | McConnell ........................ 285/318 |
| 5,321,784 | 6/1994 | Cubukciyan et al. . |
| 5,816,626 | 10/1998 | Anderson et al. . |

FOREIGN PATENT DOCUMENTS

| | | |
|---|---|---|
| 63-64007 | 3/1988 | (JP) . |
| 1-134406 | 5/1989 | (JP) . |
| 2-85808 | 3/1990 | (JP) . |

* cited by examiner

*Primary Examiner*—Cassandra Spyrou
*Assistant Examiner*—Leo Boutsikaris
(74) *Attorney, Agent, or Firm*—Larry I. Shelton

(57) ABSTRACT

A fiber optic connector for connecting fiber optic light cables together includes a light housing for connection to a first fiber optic light cable and a coupling for connection to a second fiber optic light cable. The coupling includes a cage having a spring for locking the light housing to the coupling to connect the first fiber optic light cable and second fiber optic light cable together into a single light source.

20 Claims, 1 Drawing Sheet

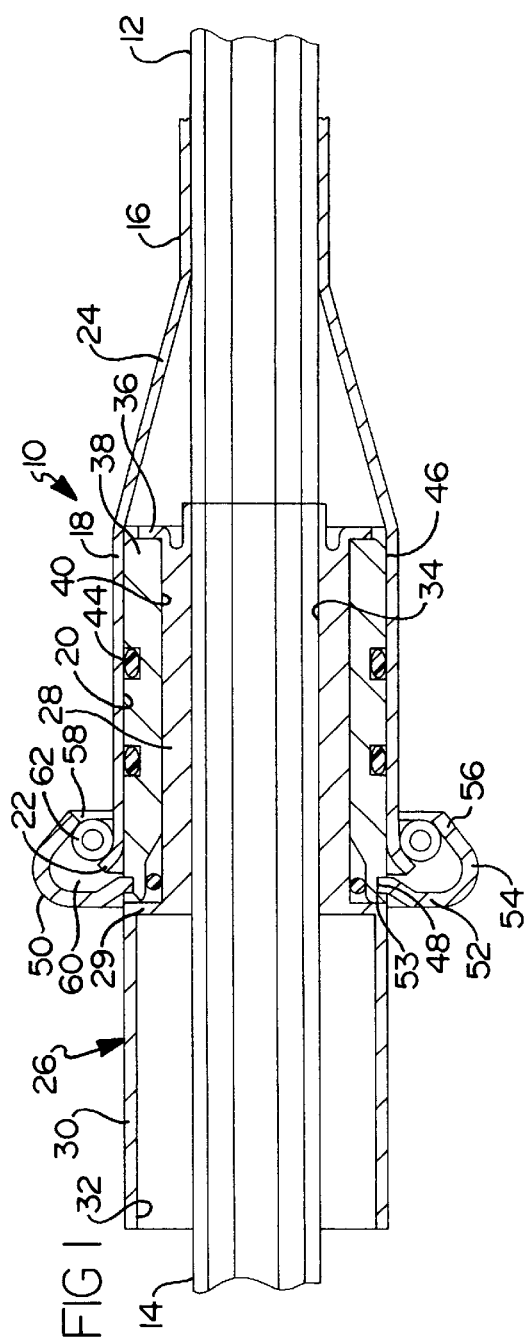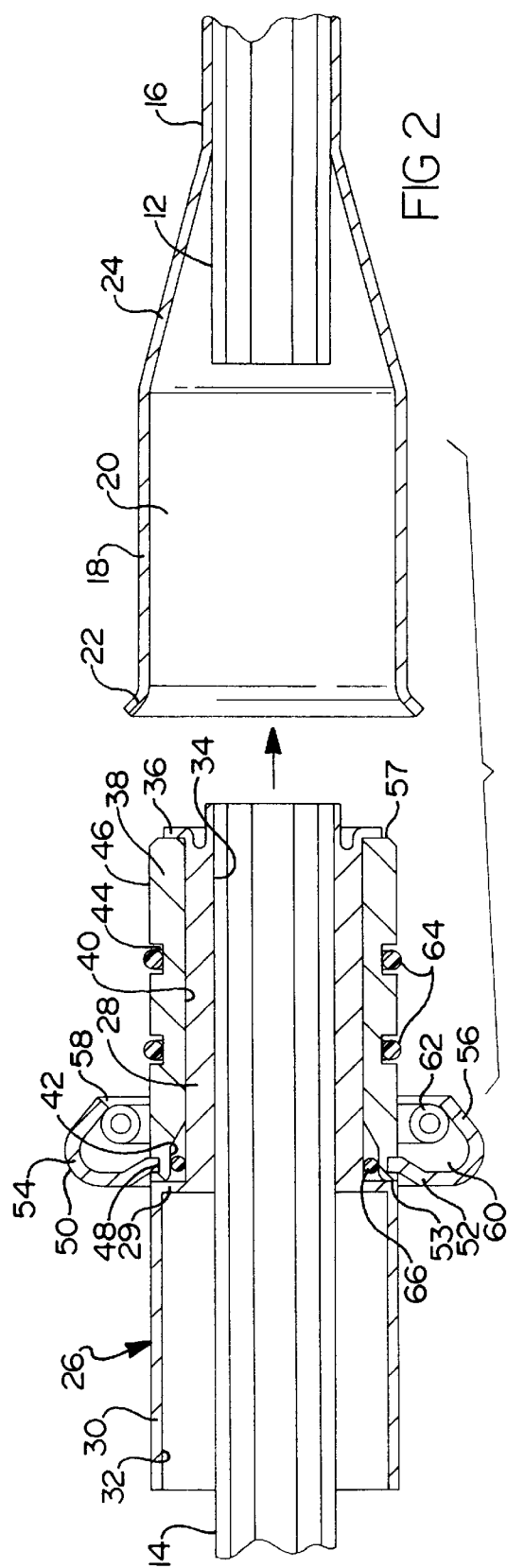

FIBER OPTIC CONNECTOR

BACKGROUND OF THE INVENTION

1. Field of the Invention

The present invention relates generally to fiber optic light cables and, more specifically, to a connector for connecting fiber optic light cables together.

2. Description of the Related Art

It is known that fiber optic light cables are used for high-speed communication and data transmission. It is also known that these fiber optic light cables are typically connected together with fiber optic connectors, which may be easily coupled and uncoupled. As used herein, the term "connector" means an article which allows connection, disconnection and reconnection of two fiber optic light cables, as opposed to a "splice" which normally connotes a permanent connection between the cables.

An example of such a fiber optic connector is disclosed in U.S. Pat. No. 5,321,784. In this patent, a fiber optic connector includes an extended ferrule collar and a surrounding body adapted to be received in one of several different connector shells. The ferrule collar and body form a subassembly that can be factory mounted to a fiber optic light cable.

Although the above fiber optic connector has worked, there is a need in the art to provide a fiber optic connector which retains the light cable from moving axially to ensure light transfer efficiency. Also, there is a need in the art to provide a fiber optic connector which prevents environmental contaminants from entering therein.

SUMMARY OF THE INVENTION

Accordingly, the present invention is a fiber optic connector for connecting fiber optic light cables together. The fiber optic connector includes a light housing for connection to a first fiber optic light cable and a coupling for connection to a second fiber optic light cable. The coupling includes a cage having a spring for locking the light housing to the coupling to connect the first fiber optic light cable and second fiber optic light cable together into a single light source.

One feature of the present invention is that a fiber optic connector for connecting fiber optic light cables together into a single light source is provided. Another feature of the present invention is that the fiber optic connector retains the fiber optic light cables from moving axially to ensure light transfer efficiency. Yet another feature of the present invention is that the fiber optic connector also seals a joint to keep environmental contaminants out of the connector. Still another feature of the present invention is that the fiber optic connector uses two o-rings to minimize lateral movement as well as providing a seal.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a fragmentary elevational view of a fiber optic connector, according to the present invention, illustrated in operational relationship with fiber optic light cables.

FIG. 2 is an exploded fragmentary elevational view of the fiber optic connector and fiber optic light cables of FIG. 1.

DESCRIPTION OF THE PREFERRED EMBODIMENT(S)

Referring to the drawings and in particular FIG. 1, one embodiment of a fiber optic connector 10, according to the present invention, is illustrated in operational relationship with a first fiber optic light cable 12 and a second fiber optic light cable 14. The fiber optic light cables 12 and 14 may be a single cable or a plurality of cables bundled together to form a single cable. It should be appreciated that, except for the fiber optic connector 10, the fiber optic light cables 12 and 14 are conventional and known in the art.

Referring to FIGS. 1 and 2, the fiber optic connector 10 includes a female fitting or light housing 16 connected to one end of the first fiber optic light cable 12. The light housing 16 has an end portion 18 that is generally cylindrical and slightly enlarged from a diameter of the light housing 16 to form a cavity 20. The light housing 16 also has a circumferential flange 22 at a terminal end of the end portion 18 for a function to be described. The light housing 16 has a transition portion 24 extending between the end portion 18 and a remainder of the light housing 16. The light housing 16 is made of a rigid material such as metal. The light housing 16 is secured to the first fiber optic light cable 12 by suitable means such as a press-fit. It should be appreciated that the light housing 16 is a monolithic structure being integral, unitary and formed as one-piece.

The fiber optic connector 10) also includes a male fitting or coupling, generally indicated at 26, connected to one end of the second fiber optic light cable 14 and cooperating with the light housing 16. The coupling 26 includes a ferrule 28 extending axially to a shoulder 29 extending radially. The ferrule 28 has an end portion 30 generally cylindrical and slightly enlarged from a diameter of the ferrule 28 and extending axially from the shoulder 29 to form a cavity 32. The ferrule 28 also has a passageway 34 extending axially therethrough and communicating with the cavity 32. The second fiber optic light cable 14 extends through the cavity 32 and passageway 34 and preferably terminates at the end of the passageway 34. The ferrule 28 also has a flange 36 extending radially outwardly near one end thereof for a function to be described. The ferrule 28 is made of a rigid material such as metal. The ferrule 28 is secured to the second fiber optic light cable 14 by suitable means such as a press-fit. It should be appreciated that the ferrule 28 is a monolithic structure being integral, unitary and formed as one-piece.

The coupling 26 also includes a spud 38 disposed about a portion of the ferrule 28. The spud 38 extends axially and is generally cylindrical in shape. The spud 38 has a passageway 40 extending axially therethrough. The passageway 40 has an enlarged opening 42 at one end thereof for a function to be described. The spud 38 also includes at least one, preferably a plurality of first grooves 44 in an outer surface 46 thereof. The first grooves 44 are annular and have a generally rectangular cross-sectional shape. The first grooves 44 are spaced axially for a function to be described. The spud 38 further includes a second groove 48 in the outer surface 46 at the end with the enlarged opening 42. The second groove 48 is annular and generally rectangular in cross-sectional shape for a function to be described. The spud 38 is made of a rigid material such as metal. The spud 38 is disposed about the ferrule 28 and mechanically locked or secured in place to the ferrule 28 between the shoulder 29 and flange 36 of the ferrule 28, providing a metal-to-metal environmental seal. It should be appreciated that the spud 38 is a monolithic structure being integral, unitary and formed as one-piece.

The coupling 26 includes a cage 50 connected to one end of the spud 38. The cage 50 has a base portion 52 extending radially and disposed in the second groove 48. The cage 50 is attached at the base portion 52 to the spud 38 by a crimped flange 53 on the spud 38 forming a portion of the second groove 48 to mechanically lock the cage 50 to the spud 38. It should be appreciated that other types of connection are also possible, such as welding, soldering, etc.

The cage 50 also has a curved wall portion 54 and a circular flange portion 56. The curved wall portion 54 is connected to the base portion 52. The circular flange portion 56 is connected to the curved wall portion 54 and is angularly inclined toward a terminal end 57 of the spud 38. The circular flange portion 56 ends at such a point that there is an access opening 58 which allows a portion of the light housing 16 to be extended therein. The cage 50 defines an annular space 60 around the end of the spud 38. The curved wall portion 54 defines the largest diameter location of the annular space 60. The cage 50 also includes a spring 62 of a garter type located inside the annular space 60 and normally disposed on the outer surface 46 of the spud 38 which is capable of holding the light housing 16 to the coupling 26.

The coupling 26 includes at least one, preferably a plurality of first seals 64 disposed in the first grooves 46. The first seals 64 are o-rings made of an elastomeric material. One first seal 64 is disposed in one first groove 46 for a function to be described.

The coupling 26 may include a second seal 66 disposed between the spud 38 and ferrule 28. The second seal 66 is an o-ring made of an elastomeric material. The second seal 66 is disposed about the ferrule 28 in the enlarged opening 42 of the passageway 40 between the ferrule 28 and spud 38 to act as an o-ring seal for enhanced environmental sealing. It should be appreciated that the second seal 66 is optional.

In operation of the fiber optic connector 10, the light housing 16 is connected to the first fiber optic light cable 12. The coupling 26 is connected to the second fiber optic light cable 14 as illustrated in FIG. 2. The end portion 18 of the light housing 16 is moved axially toward the spud 38 such that the spud 38 and ferrule 28 are disposed in the cavity 20. The end portion 18 is moved over the spud 38 to compress the first seals 64 and the flange 22 enters the access opening 58 in the cage 50. The flange 22 deflects the spring 62 radially and moves axially past the spring 62. The spring 62 returns radially and is disposed between the flange 22 and flange portion 56 to secure the end portion 18 in place on the spud 38 as illustrated in FIG. 1. The fiber optic connector 10 retains the fiber optic light cables 12 and 14 from moving axially to ensure light transfer efficiency. The fiber optic connector 10 also seals a joint between the coupling 26 and light housing 16 with the first seals 64 to keep environmental contaminants out of the light housing 16. The first seals 64 are used to minimize the lateral movement as will as providing a seal. A service tool (not shown) is used to disconnect the coupling 26 and light housing 16. It should be appreciated that the service tool is conventional and known in the art. It should be appreciated that the fiber optic connector 10 serves as an attachment for connecting two fiber optic light cables 12 and 14 together into a single light source.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fiber optic connector assembly comprising:
   a first fiber optic light cable having a light housing;
   a second fiber optic light cable having a coupling; and
   said coupling including a cage having a spring for locking said light housing to said coupling to connect said first fiber optic light cable and said second fiber optic light cable together.

2. A fiber optic connector for connecting fiber optic light cables together comprising:
   a light housing for connection to a first fiber optic light cable;
   a coupling for connection to a second fiber optic light cable;
   said coupling including a cage having a spring for locking said light housing to said coupling to connect the first fiber optic light cable and second fiber optic light cable together; and
   wherein said coupling comprises a ferrule extending axially and having an enlarged portion at one end with a cavity therein and a passageway extending axially therethrough and communicating with said cavity for receiving the second fiber optic light cable.

3. A fiber optic connector as set forth in claim 2 wherein said ferrule has a shoulder extending radially at one end of said enlarged portion and a flange extending radially at a terminal end of said ferrule and spaced axially from said shoulder.

4. A fiber optic connector as set forth in claim 2 wherein said ferrule is made of a metal material.

5. A fiber optic connector as set forth in claim 2 wherein said coupling further comprises a spud disposed about a portion of said ferrule and connected to said cage.

6. A fiber optic connector as set forth in claim 5 wherein said spud has a passageway extending axially therethrough with an enlarged opening at one end.

7. A fiber optic connector as set forth in claim 6 wherein said coupling includes a seal disposed about said ferrule in said enlarged opening between said spud and said ferrule.

8. A fiber optic connector as set forth in claim 5 wherein said spud has an outer surface with at least one annular groove therein.

9. A fiber optic connector as set forth in claim 8 wherein said coupling includes at least one seal disposed in said at least one annular groove.

10. A fiber optic connector as set forth in claim 8 wherein said cage has a base portion extending radially and disposed in said at least one groove.

11. A fiber optic connector as set forth in claim 5 wherein said spud is made of a metal material.

12. A fiber optic connector assembly as set forth in claim 1 wherein said cage comprises a base portion extending radially, a curved wall portion connected to said base portion and a circular flange portion connected to said curved wall portion to form an annular space.

13. A fiber optic connector assembly as set forth in claim 12 wherein said cage includes an opening in said flange portion, said spring being disposed in said space adjacent said opening.

14. A fiber optic connector assembly as set forth in claim 1 wherein said spring is a garter spring.

15. fiber optic connector assembly as set forth in claim 1 wherein said light housing has an enlarged end portion and a circumferential flange extending from said end portion.

16. A fiber optic connector for connecting fiber optic light cables together comprising:

a light housing for connection to a first fiber optic light cable;

a coupling for connection to a second fiber optic light cable; and said coupling including a ferrule extending axially and having a passageway for receiving the second fiber optic light cable, a spud disposed about a portion of said ferrule, and a cage connected to said spud and having a spring for locking said light housing to said coupling to connect the first fiber optic light cable and second fiber optic light cable together.

17. A fiber optic connector as set forth in claim 16 wherein said ferrule extends axially and has an enlarged portion at one end with a cavity therein communicating with said passageway for receiving the second fiber optic light cable.

18. A fiber optic connector as set forth in claim 17 wherein said ferrule has a shoulder extending radially at one end of said enlarged portion and a flange extending radially at a terminal end of said ferrule and spaced axially from said shoulder, said spud being disposed about a portion of said ferrule between said shoulder and said flange.

19. A fiber optic connector as set forth in claim 16 wherein said spud has an outer surface with at least one annular groove therein and at least one seal disposed in said at least one annular groove.

20. A fiber optic assembly comprising:

a first fiber optic light cable;

a second fiber optic light cable;

a light housing connected to said first fiber optic light cable;

a coupling connected to said second fiber optic light cable;

said coupling including a ferrule extending axially and having a passageway receiving said second fiber optic light cable, a spud disposed about a portion of said ferrule, and a cage connected to said spud and having a spring for locking said light housing to said coupling to connect said first fiber optic light cable and said second fiber optic light cable together.

* * * * *